Sept. 17, 1968  R. W. PARTRIDGE  3,401,577
STEERING DEVICES FOR AN AIRCRAFT WHEEL MOUNTING
Filed July 13, 1966  5 Sheets-Sheet 2

INVENTOR
R. W. PARTRIDGE

INVENTOR
R. W. PARTRIDGE

United States Patent Office 3,401,577
Patented Sept. 17, 1968

3,401,577
STEERING DEVICES FOR AN AIRCRAFT
WHEEL MOUNTING
Raymond William Partridge, Cinderford, England, assignor to Dowty Rotol Limited, Gloucester, England, a British company
Filed July 13, 1966, Ser. No. 564,865
Claims priority, application Great Britain, July 14, 1965, 29,826/65
9 Claims. (Cl. 74—498)

ABSTRACT OF THE DISCLOSURE

A drive mechanism is disclosed for the rotatable steering member of a ground engaging element which is casterable on the ground. The drive mechanism comprises a rack and pinion mechanism in which the pinion is interconnected with the steering member to rotate therewith, and interengageable with the rack to be driven thereby over a predetermined range of angular steering movement. In addition, the drive mechanism includes a pair of pistons disposed to abut the ends of the rack and each operable to drive the rack through positions corresponding to the range of angular steering movement, or in the alternative to retract with the rack through the same positions. The drive strokes of the pistons are restricted to positions of the rack corresponding to the end positions of the pinion in the range of angular steering movement. Yet the ground engaging element can caster on the ground when the pinion is disposed in either of the aforesaid end positions, by the further inclusion of means whereby in either of the latter positions thereof, the rack can be retracted from the drive piston to a new position relatively outside the range of steering movement, and means whereby the other piston can be retracted to the new position therewith.

---

Figure 1:
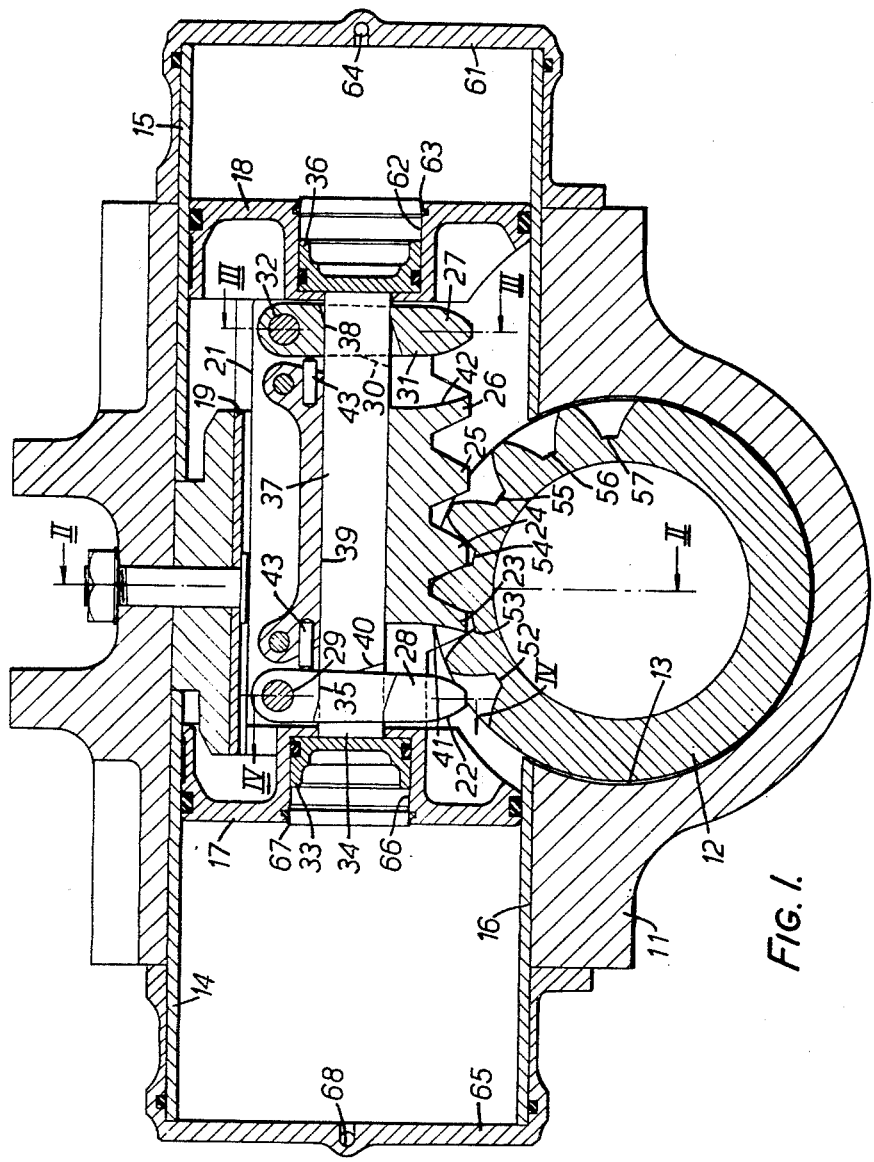

This invention relates to steering devices for an aircraft wheel mounting of the kind in which power steering is provided over a given range of steering angle on opposite sides of the central position, and in which the wheel mounting is, alternatively, freely casterable through a complete turn or more.

In United States patent specification No. 3,035,793 steering mechanism for an aircraft wheel mounting is described, comprising a pinion attached to the steerable member of the wheel mounting, a power-operated rack capable of meshing with the pinion and mounted in the fixed part of the wheel mounting for movement in a direction transverse to the steering axis of the wheel mounting, the rack having a range of transverse movement which enables it to pass out of meshing engagement with the pinion at opposite ends of the range during free castering movement of the wheel mounting, a number of gear teeth on the rack and a corresponding number of sockets in the pinion, shaped to receive the rack teeth in meshing engagement therewith, each end tooth of the rack being engageable with the corresponding end socket in the pinion and none other, and spring means arranged to cause re-engagement of the rack teeth with the pinion sockets after free castering of the wheel mounting when the pinion turns towards meshing engagement with the rack.

The present invention is concerned with constructional features of the rack mechanism and the power-operating mechanism therefor which contribute to economy in the over-all length of the mechanisms.

The present invention provides, in one aspect, an improvement or modification of the rack and pinion steering mechanism described in the specification referred to, in which stop means is arranged to determine each end position of the rack such that a fixed tooth on the rack next to an end tooth lies outside the outer circumference of the pinion, and wherein the end tooth is mounted on the rack for movement relative to said next tooth such that when the rack is in the one end position and the pinion is turned in one direction during free castering of the wheel mounting, the end tooth is moved by the corresponding socket in the pinion towards said next tooth and outside the outer circumference of the pinion, and when the pinion is turned back in the other direction, the end tooth is urged by the spring means into the corresponding socket and up to an end position of even tooth spacing, after which continued movement of the pinion causes movement of the rack from said end position.

The present invention also provides, in another aspect, an improvement or modification of the rack and pinion steering mechanism described in the specification referred to, in which the rack is power-operated over a steering range by pistons which abut the rack and which are arranged in cylinders at opposite ends of the rack, and wherein, during free castering of the wheel mounting, each piston is retained at a respective end of the steering range by an inward limit stop which enables the rack to separate from the piston during continued movement of the pinion beyond the steering range, the other piston being then movable by the rack up to an outward limit stop such that the rack then occupies a position at which the pinion can turn out of meshing engagement with the rack.

Figure 2:
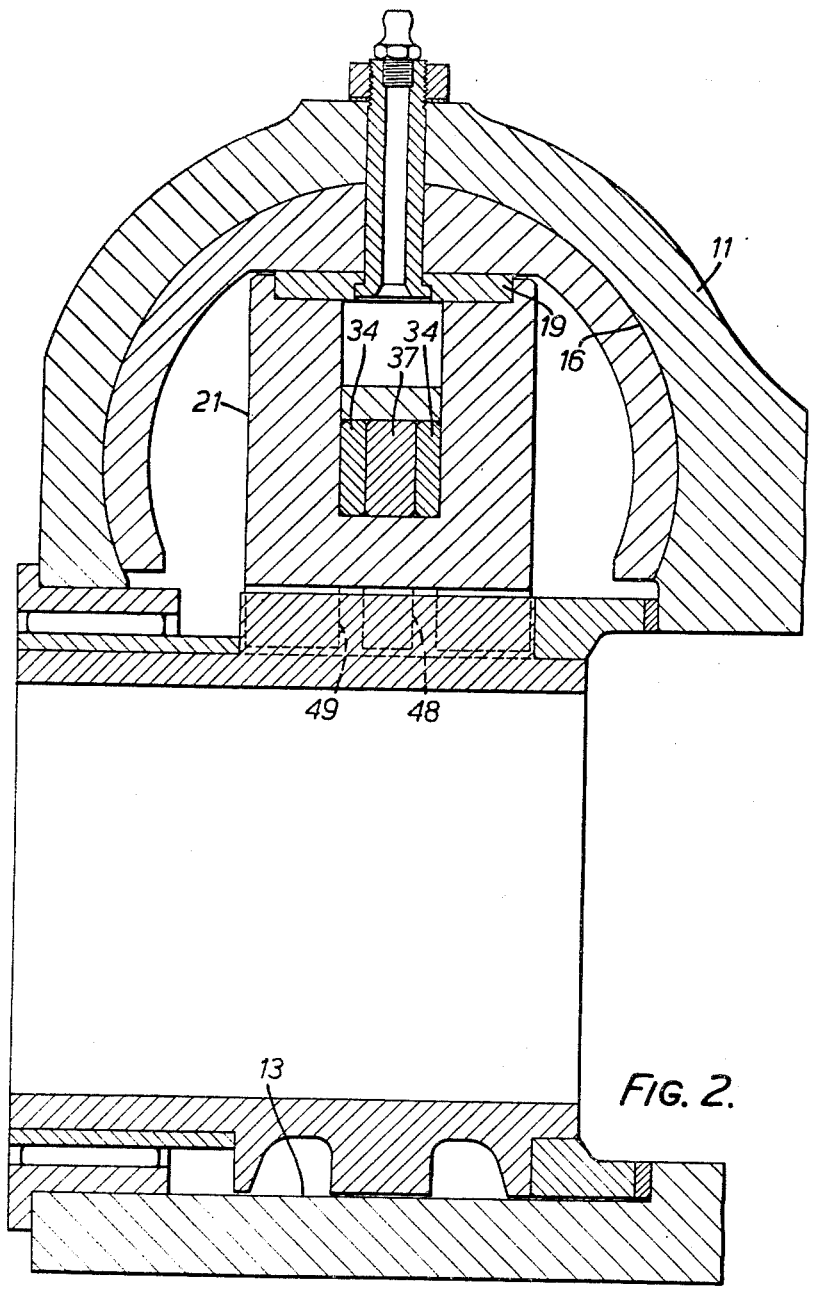
Figure 3:
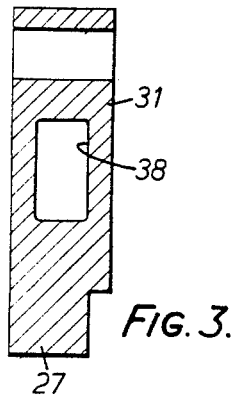
Figure 4:
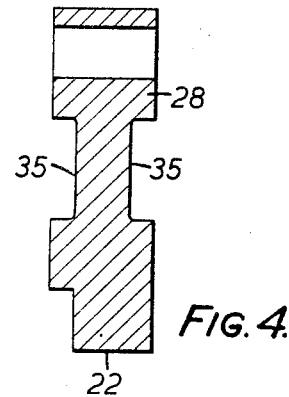
Figure 5:
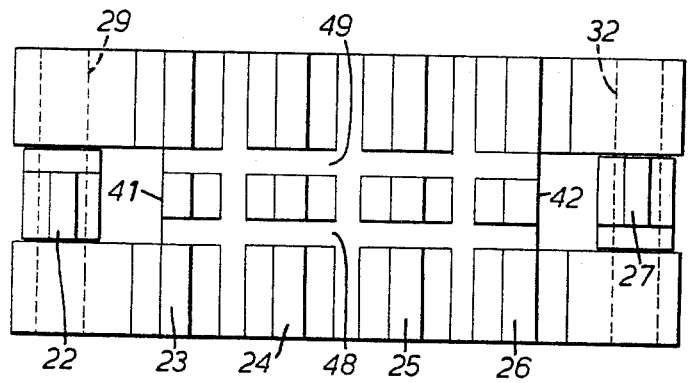
Figure 6:
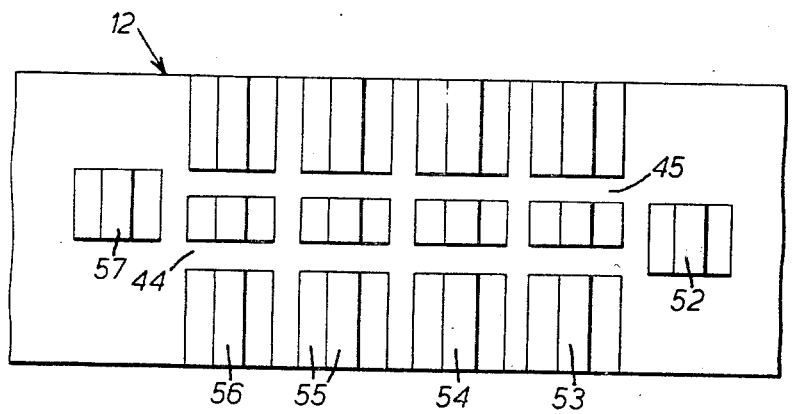
Figure 7:
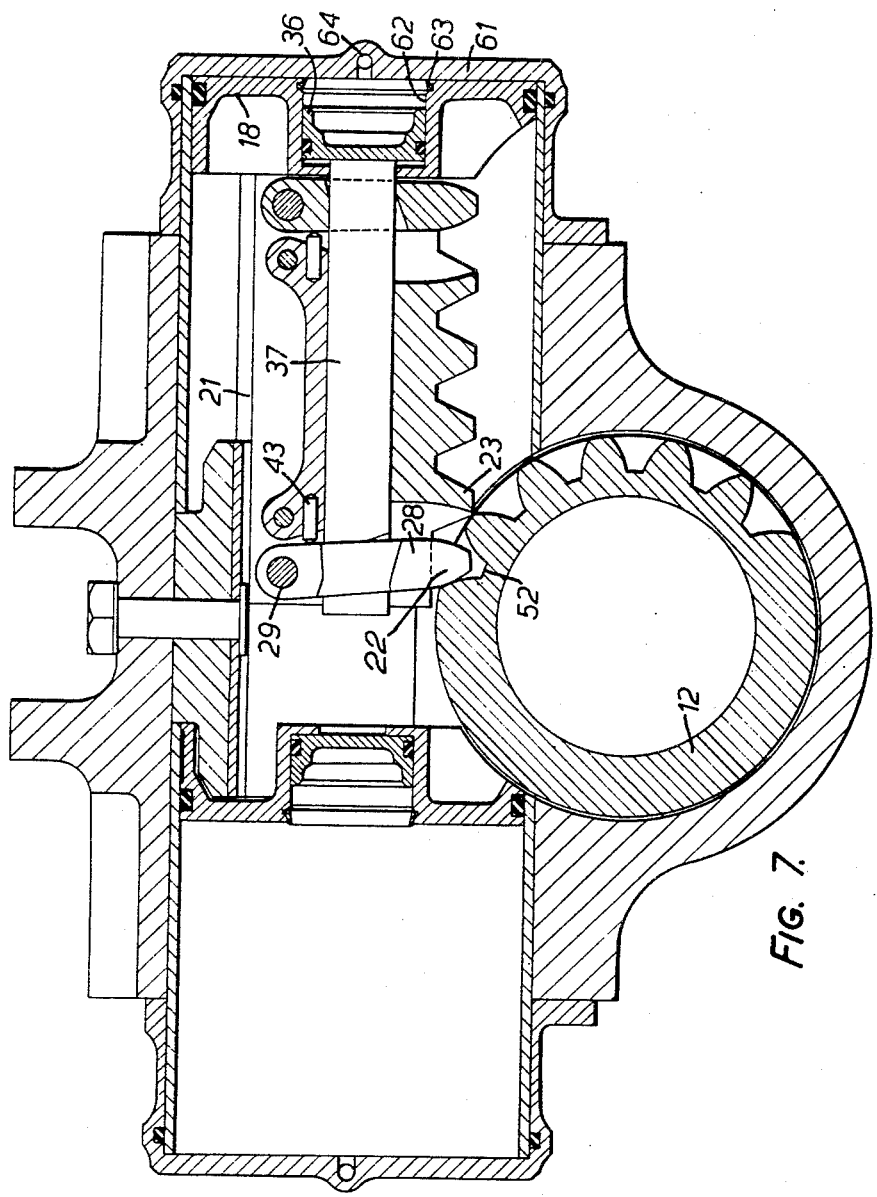
Figure 8:
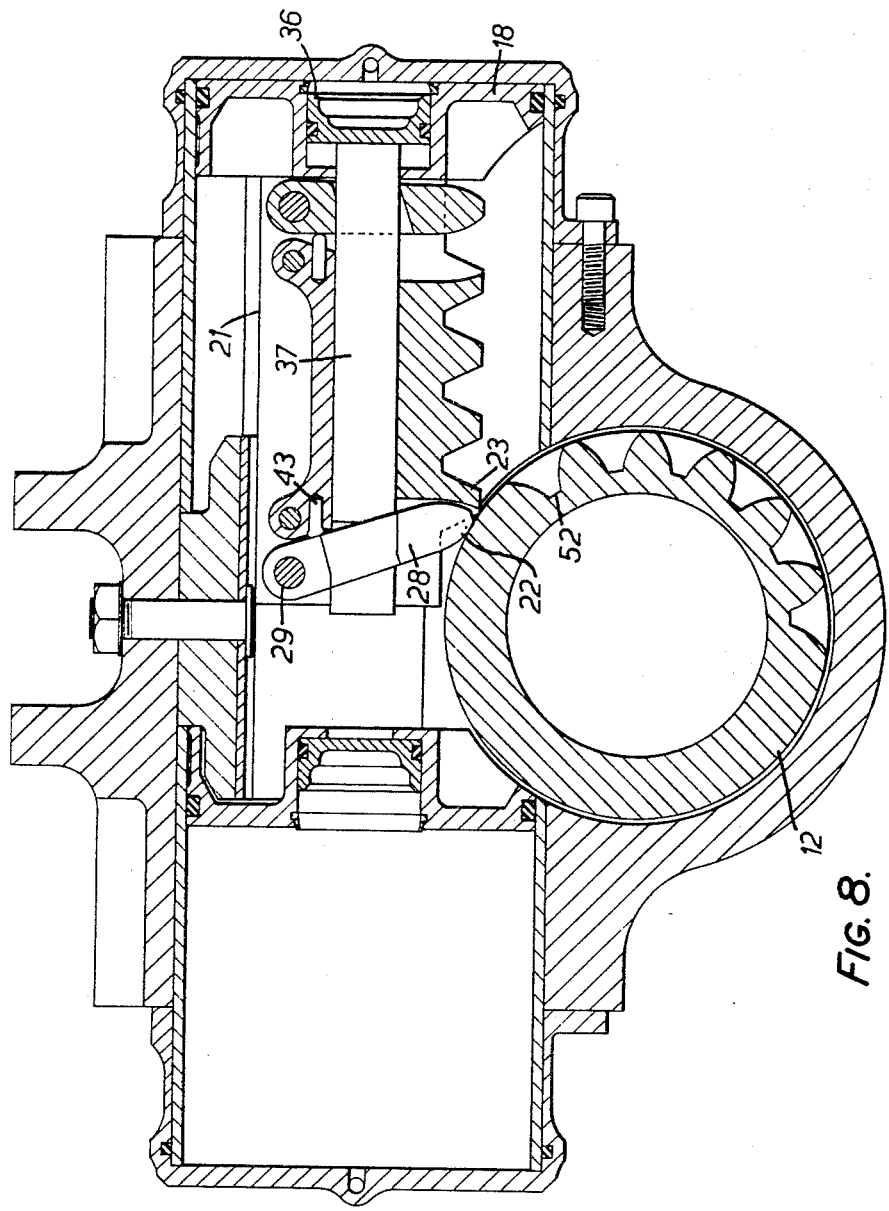

An embodiment of the present invention is illustrated in the accompanying drawings, of which:

FIGURE 1 is a partly sectional view of a rack and pinion steering device in a plane transverse to the central axis of the steerable member, FIGURE 2 is a sectional view of the steering device along section line II—II of FIGURE 1, FIGURE 3 shows a section of a detail on the line III—III of FIGURE 1, FIGURE 4 shows a section of a detail on the line IV—IV of FIGURE 1, FIGURE 5 is a view of the rack, looking at the teeth in plan, FIGURE 6 is a view of the pinion developed in a flat plane and looking at the teeth-engaging sockets in plan, and FIGURES 7 and 8 are views in the same plane as FIGURE 1, showing the steering device at different stages of operation.

The steerable member of the aircraft wheel mounting is not shown, but the upper part of a housing 11 in which the steerable member is mounted is shown with a bore 13 therein receiving a pinion 12 which is fixed to the upper end of the steerable member. Motor cylinders 14 and 15 are fixed co-axially in opposite end portions of a transverse bore 16 in the housing 11 which intersects the bore 13, whereby the pinion 12 projects partly into the transverse bore 16. A main piston 17 is mounted in the cylinder 14 and a separate main piston 18 is mounted in the cylinder 15. The outer ends of the cylinders 14, 15 have closures formed by end caps 65 and 61 respectively. These end caps constitute stop means which determine the outer end positions of the respective pistons 17, 18. A guide member 19 fixed to the housing 11 between the inner ends of the cylinders 14 and 15 has guide surfaces which are parallel to the central axis of the cylinders.

A rack member 21 is slidably mounted on the guide surfaces, and the main pistons 17 and 18 abut opposite ends respectively of the rack member for steering the wheel mounting under the selective application of fluid pressure to the pistons 17 and 18. The rack member 21 constitutes a main portion having fixed teeth 23, 24, 25 and 26 and movable teeth 22 and 27 at opposite ends of the row of fixed teeth. The movable tooth 22 is formed on an element 28 which is pivotally mounted at 29 on the main portion, and the movable tooth 27 is likewise formed on an element 31 which is pivotally mounted at 32 on the main portion.

A supplementary piston 33 mounted to slide centrally in the main piston 17 has a piston rod formed as a pair of parallel rectangular bars 34 which pass across slots 35 formed on opposite faces respectively of the element 28, FIGURES 2 and 4, the nearside bar not being shown in FIGURE 1. The ends of the bars 34, shown in chain dot line in FIGURE 1, are partially chamfered at 30 and are capable of abutting one side face of the element 31. A supplementary piston 36 mounted to slide centrally in the main piston 18 has a piston rod formed as a single rectangular bar 37, FIGURE 2, which passes through a slot 38 formed in the element 31 FIGURE 3, and which lies between the bars 34. The bars 34 and 37 together pass slidably through a longitudinal fitting opening 39 in the rack member 21. The end of the bar 37 is partially chamfered at 30 and is capable of abutting one side face of the element 28. The slots 35 and 38 are formed so that each element 28 or 31 is capable of occupying two end positions. In one end position, each element 28 or 31 is held by engagement of its slot 35 or 38 with the respective bar 34 or 37 at an even spacing of the tooth 22 or 27 as the case may be with respect to the fixed teeth 23–26, while in the other end position each tooth 28 or 31 can turn to lie close against the adjacent fixed teeth 24 or 26 respectively. These fixed teeth 24 and 26 are cut away at 41 and 42 respectively to receive the movable teeth 22 and 27 closely. Both elements 28 and 31 are urged by springs 43 to move to their end positions of even tooth spacing. The operation of the supplementary pistons 33 and 36 on the movable elements 28 and 31 will subsequently be described.

The pinion 12 is developed in a single plane in FIGURE 6 to show its form more clearly. It is formed with sockets 52–57 in its generally cylindrical surface, these sockets being equal in number to the number of teeth on the pinion. The sockets 53–56 are divided into three parts by two parallel webs 44, 45. The web 44 is defined by a portion of the generally cylindrical surface which is circumferentially continuous except for an interruption formed by the socket 52. The web 45 is defined by a portion of the generally cylindrical surface which is circumferentially continuous except for an interruption formed by the socket 57.

The rack member 21 has a form complemental to that of the pinion 12. Thus, the teeth 23–26 are divided into three parts by two parallel grooves 48 and 49 which are able to receive the respective webs 44 and 45. The tooth 22 can enter the socket 52 but no other because of the web 44. The tooth 27 can enter the socket 57 but no other because of the web 45. The arrangement is a modification of that described in United States patent specification No. 3,035,793 wherein a rack and pinion steering mechanism after disengagement and free castering, can only re-engage in correct mesh.

The operation of the steering device will now be described. Normal steering of the steerable member takes place over a defined range limited to equal steering angles on opposite sides of the central position of the steerable member in which the wheels run in line ahead. Steering is effected by the selective application of fluid pressure in one or other of the cylinders 14 and 15, and at each limit of the steering range one or other of the end fixed teeth 23 or 26 remains in meshing engagement with the corresponding socket 53 or 56.

When the rack member 21 reaches one or other end of the steering range, the fluid-pressure-actuated piston 17 or 18 is retained by the guide member 19 which forms a limit stop to inward movement.

If the steerable member is to be allowed to caster freely, fluid power is isolated from the steering motor and the interiors of the cylinders 14 and 15 are connected for free flow of fluid from one to the other, or vice versa. Suitable valve devices of known form are provided for this purpose, though not illustrated. The steerable member can then turn freely over the steering range and beyond. If, for example the steerable member casters in a clockwise direction, the piston 17 is stopped by the guide member 19 at one end of the normal steering range, and with continued turning of the pinion 12, the rack 21 separates from the piston 17 and pushes the other piston 18 towards the outer end stop provided by the closure 61. In this position, FIGURE 7, the tooth 23 lies outside the outer circumfernce of the pinion 12. The movable tooth 22 is still in the socket 52, but with continued rotation of the pinion 12, the tooth 22 is moved by the socket 52 towards the next tooth 23 against the load of the spring 43, and outside the outer circumference of the pinion 12, FIGURE 8. The rack 21 does not move during the latter operation, since it is retained by the end stop provided by engagement of the piston 18 with the closure 61.

If the steerable member continues castering in a clockwise direction so that the pinion sockets re-enter the path of the rack teeth, the tooth 22 on the pivoted element 28 rides on the cylindrical surface of the pinion and maintains the rack in its end position. The tooth 22 can only drop back in the corresponding socket 52 when this passes under the tooth.

If the steerable member casters back in the opposite direction, a point is reached at which the movable tooth 22 is urged back into the socket 52 under the load of the spring 43 and the element 28. When the element 28 is stopped in its end position of even tooth spacing, by engagement of the slot 35 and the bar, continued movement of the steerable member causes movement of the rack 21 from its end position by meshing engagement of the fixed teeth in the corresponding sockets.

The formation of the pistons 17, 18 as members separable from the rack 21, and the provision of inward limit stops for these pistons, enables the overall length of the steering motor to be reduced compared with known arrangements in which the pistons and rack form a rigid assembly or unitary structure.

It is normally required that a steering member on an aircraft shall be centered for retraction of the wheel mounting after take-off, and in most cases the steerable member will lie within the steering range at take-off whereby centering by fluid power is readily achieved. It is possible, however, in the case of a vertical take-off aircraft that the steerable member may lie outside the steering range as the result of a maneuver prior to take-off. The present steering device is capable of centering the steerable member from a position lying within a predetermined angle on each side of the central position outside the steering range. This is accomplished by one or other of the supplementary pistons 33 and 36.

This operation can be understood with reference to FIGURE 7. The pinion 12 lies outside the steering range, while the main piston 18 abuts the closure 61 at the outer end of the cylinder 15. A bore 62 in the piston 18 within which the supplementary piston 36 slides, has a sealing ring 63 at its mouth which abuts the closure 61, so that fluid pressure admitted through a central passage 64 in the closure is initially confined to the supplementary piston 36. This supplementary piston 36 acting through the bar 37 which abuts the element 28 can exert a turning force on the element from its end position against the fixed tooth 23, FIGURE 8, to its end position of even tooth spacing. This turning force, acting against the socket 52, applies a centering torque to the steerable member. The supplementary piston 36 has a smaller area than that of the main piston 18, but since centering will take place when the aircraft is airborne, the lesser centering torque from the predetermined angle up to the beginning of the steering range will be sufficient.

When the element 28 reaches its end position of even tooth spacing, the fluid pressure load on the supplementary piston is transmitted to the main piston 18, which then moves to separate the sealing ring 63 from the closure 61 whereby fluid pressure from the central passage 64 is admitted to the main piston 18. The piston 18 then actuates the rack 21 within the normal steering range to centralise the pinion 12 and the steerable member. The ability of the device to centralise the steerable member from the predetermined angle outside the steering range is provided by the supplementary pistons and the movable teeth, without the need to increase the power-operated stroke of the main portion of the rack member.

The closure 65 has a central fluid supply passage 68, while the supplementary piston 33 slides in a bore 66. A sealing ring 67 at the mouth of the bore 66 abuts the closure 65 when the piston 17 occupies its end position abutting the closure 65. The pinion 12 and the steerable member can therefore be centered from a position outside the steering range on the other side of center in a similar manner, by the action of the end of the rectangular bar 34 against the pivoted element 31.

I claim as my invention:

1. Steering mechanism for an aircraft wheel mounting having a fixed member and a steerable member mounted for rotation therein, a pinion connected to the steerable member for rotation therewith, said pinion having a number of sockets formed in part of its peripheral face, a rack mounted in the fixed member for linear movement in a direction transverse to but spaced from the rotational axis of the pinion, power-actuating means operable on the rack, a number of fixed teeth, less by two than the number of sockets, formed on the rack and engageable with corresponding intermediate sockets in the pinion over a power-actuated steering range of the pinion, and two movable teeth mounted one at each end of the rack and each being complementally shaped with a corresponding end socket in the pinion so that the end tooth is engageable with said socket and none other, each movable tooth having one end position of even tooth spacing with respect to the fixed teeth and another end position close to the adjacent fixed tooth, loading means urging each movable tooth towards the end position of even tooth spacing, stop means arranged to determine each end position of the rack in the fixed member such that when the rack is in one of said end positions, one movable end tooth in its end position of even tooth spacing, engages the corresponding end socket in the pinion and the adjacent fixed tooth lies outside the outer circumference of the pinion; the movable tooth being then movable by the corresponding end socket, upon castering of the pinion in one direction, beyond the steering range, to its end position close to the adjacent fixed tooth so that it lies outside the outer circumference of the pinion thus enabling the pinion to turn without corresponding movement of the rack, and the movable tooth being movable by the loading means, upon castering the pinion back in the other direction, into the corresponding end socket so that the rack and pinion become enmeshed during continued turning back of the latter, the rack being power-operable by two main pistons which respectively are mounted in cylinders disposed at opposite ends of the rack, and closures being provided on the outer ends of the cylinders, said closures determining the outer end positions of said pistons and thus constituting the stop means which determines each end position of the rack, the pistons being formed as separate elements which abut the rack over the steering range of said mechanism, and an inward limit stop being provided for each piston at a corresponding end of the steering range, the other piston not so stopped being movable by the rack, during turning movement of the pinion beyond the steering range, up to the closure of the cylinder in which it is mounted.

2. Steering mechanism for an aircraft wheel mounting having a fixed member and a steerable member mounted for rotation therein, a pinion connected to the steerable member for rotation therewith, said pinion having a number of sockets formed in part of its peripheral face, a rack mounted in the fixed member for linear movement in a direction transverse to but spaced from the rotational axis of the pinion, power-actuating means operable on the rack, a number of fixed teeth, less by two than the number of sockets, formed on the rack and engageable with corresponding intermediate sockets in the pinion over a power-actuated steering range of the pinion, and two movable teeth mounted one at each end of the rack and each being complementally shaped with a corresponding end socket in the pinion so that the end tooth is engageable with said socket and none other, each movable tooth having one end position of even tooth spacing with respect to the fixed teeth and another end position close to the adjacent fixed tooth, loading means urging each movable tooth towards the end position of even tooth spacing, stop means arranged to determine each end position of the rack in the fixed member such that when the rack is in one of said end positions, one movable end tooth in its end position of even tooth spacing, engages the corresponding end socket in the pinion and the adjacent fixed tooth lies outside the outer circumference of the pinion; the movable tooth being then movable by the corresponding end socket, upon castering of the pinion in one direction, beyond the steering range, to its end position close to the adjacent fixed tooth so that it lies outside the outer circumference of the pinion thus enabling the pinion to turn without corresponding movement of the rack, and the movable tooth being movable by the loading means, upon castering the pinion back in the other direction, into the corresponding end socket so that the rack and pinion become enmeshed during continued turning back of the latter, the rack being power-operable by two main pistons which respectively are mounted in cylinders disposed at opposite ends of the rack, and closures being provided on the outer ends of the cylinders, said closures determining the outer end positions of said pistons and thus constituting the stop means which determines each end position of the rack, and means for centering the steerable member from an angular position beyond each end of the steering range, said centering means comprising a sealing device operable between each main piston, when in its outer end position, and the adjacent cylinder closure to isolate the main piston from a supply passage for actuating fluid, a supplementary piston mounted in each main piston and having communication with the supply passage and a force-transmitting connection between each supplementary piston and the movable tooth at the opposite end of the rack operable under the action of fluid pressure on the supplementary piston to urge the movable tooth towards its end position of even tooth spacing, said supplementary piston being operable thus when the main piston is in its outer end position and when the corresponding pinion socket is in position to receive the movable tooth first to turn the pinion towards its central position conjointly with movement of the movable tooth towards its end position of even tooth spacing, and secondly, when the movable tooth attains its end position, to transmit the operating force on the supplementary piston to the main piston, whereupon the transmitted force is operable to break the seal of the sealing device so that continued centering movement of the pinion is operable by the action of fluid pressure on the main piston.

3. Steering mechanism for an aircraft wheel mounting having a fixed member and a steerable member mounted for rotation therein, comprising
(A) a pinion connected to the steerable member for rotation therewith, said pinion having a row of sockets formed on a part only of its circumference,
(B) a rack mounted in the fixed member for linear movement in a direction transverse to but spaced from the rotational axis of the pinion, a row of teeth being formed on the rack to engage the sockets in the pinion over the angular steering range of the steerable member, and to become disengaged from the sockets upon turning movement of the steerable member beyond each end of the steering range, (C) two fluid-actuated pistons mounted in cylinders at opposite ends respectively of the rack, the pistons being formed as separate elements which abut the rack under fluid pressure to steer the steerable member, (D) an inner stop arranged to determine the end of the fluid-actuated stroke of each piston such that the rack holds the pinion, and thus the steerable member, at one end of the steering range, and (E) an outer stop for each piston which is so disposed that when the other piston engages its inner stop, the outer stop is spaced from the first-mentioned piston by an amount which enables the rack to move with the latter out of meshing engagement with the pinion as a consequence of castering movement of the pinion beyond the end of the steering range, the rack having at each end a tooth which is disposed for re-engagement by the pinion, upon return movement of the latter, to restore meshing engagement of the rack and pinion over the steering range of the latter.

4. In combination with a rotatable member for steering a ground engaging element which is casterable on the ground, a drive mechanism for the rotatable steering member comprising a rack and a pinion mechanism in which the pinion is interconnected with the steering member to rotate therewith, and interengageable with the rack to be driven thereby over a predetermined range of angular steering movement, a pair of pistons disposed to abut the ends of the rack and each operable to drive the rack through positions corresponding to the range of angular steering movement, or in the alternative to retract with the rack through the same positions, stop means whereby the drive strokes of the pistons are restricted to limit positions of the rack corresponding to the end positions of the pinion in the range of angular steering movement, and means whereby the ground engaging element can caster on the ground when the pinion is disposed in either of the aforesaid end positions, including means whereby in either of the corresponding limit positions thereof, the rack can be retracted from the drive piston to a new position relatively outside the range of steering movement, and means whereby the other piston can be retracted to the new position therewith.

5. The combination according to claim 4 further comprising means whereby the pinion can be disengaged from the rack in the new position thereof.

6. The combination according to claim 5 further comprising means for retaining the rack in the new position while the pinion is disengaged therefrom.

7. The combination according to claim 6 wherein the rack has a pivotable tooth thereon which disengages from the pinion at the new position.

8. The combination according to claim 7 wherein the pinion has cam means thereon which engage the pivotal tooth of the rack when the pinion is disengaged therefrom.

9. Rack and pinion steering mechanism according to claim 8, wherein each end tooth is formed on an element which is pivoted to a main portion of the rack on which the fixed teeth are formed, and wherein the loading means includes a spring acting between each of the pivoted elements and said main portion.

References Cited

UNITED STATES PATENTS

| | | | |
|---|---|---|---|
| 2,712,422 | 7/1955 | Gerwig | 244—50 |
| 3,035,793 | 5/1962 | Ralph et al. | 244—50 |

FRED C. MATTERN, Jr., *Primary Examiner.*

B. T. CALLAHAN, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,401,577                      September 17, 1968

Raymond William Partridge

It is certified that error appears in the above identified patent and that said Letters Patent are hereby corrected as shown below:

Column 6, lines 49 and 50, "passage" should read -- passage, --. Column 8, line 25, claim reference numeral "8" should read -- 3 --.

Signed and sealed this 7th day of April 1970.

(SEAL)
Attest:

Edward M. Fletcher, Jr.                  WILLIAM E. SCHUYLER, JR.
Attesting Officer                        Commissioner of Patents